April 12, 1955   S. STONE   2,706,065
CLOSURE CONNECTION
Filed April 3, 1953

INVENTOR.
SAUL STONE
BY Chas. R. Fay atty.

United States Patent Office 2,706,065
Patented Apr. 12, 1955

2,706,065

CLOSURE CONNECTION

Saul Stone, Fitchburg, Mass.

Application April 3, 1953, Serial No. 346,727

2 Claims. (Cl. 220—60)

This invention relates to a new and improved closure connection wherein the closure is made to be firmly held by the vessel that it closes but may be easily released by simple manual manipulation.

The principal object of the invention resides in the provision of a vessel or container and a closure or top cover member therefor, and including inter-engaging means between the members whereby the same are locked together in closed condition but wherein they may be easily and quickly removed by a simple manual pressure imparted in a certain location to be described.

Another object of the invention resides in the provision of a container having a cover, in combination with inter-engaging means between the cover and container in the form of a continuous rib on one member and a continuous groove receiving the rib on the other member, said rib and groove construction providing relatively sharp shoulders for locking the same together against opposed forces attempting to pull the members apart, and said container and cover being made of a naturally relatively stiff resilient material which allows a slight deformation of one member relative to the other when they are pushed together to form a kind of snap fastener locking action, the members being quickly and easily separable by pressing upon the same in diametrically opposed positions adjacent the groove and rib formation, by which action the container and cover are distorted out of normal shape, releasing the rib from the groove at at least one position at the common periphery, so that by a mere manual twisting action, the cover is easily separated from the container.

Other objects and advantages of the invention will appear hereinafter.

Reference is to be had to the accompanying drawings, in which

Figure 1:
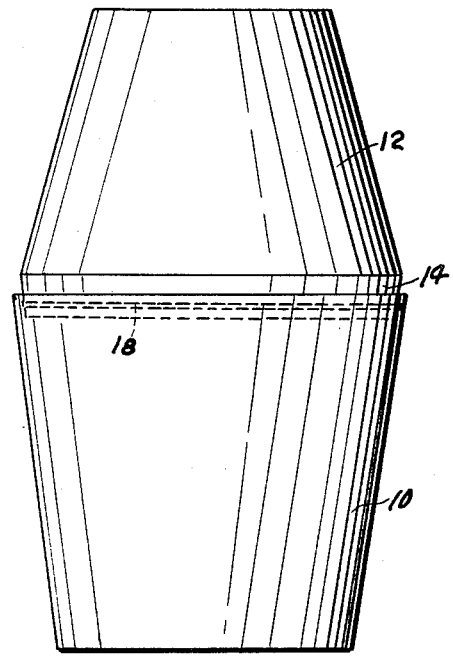
Fig. 1 is a view in front elevation of the container with cover attached.

As shown in Fig. 1, there is a container indicated at 10 which has a cover 12. These members are preferably conical or cylindrical, and have round rims or edges which meet in overlapping relation so as to close the container by means of the cover. The material of both container and cover is relatively stiff but resilient, and may be distorted manually.

The container 10 is preferably provided with diverging walls as indicated, so that it is in the shape of a truncated cone, and the same is true of the cover 12. The cover 12, however, is provided with a reversely directed rim or edge portion 14 which is generally parallel to the walls of the container 10 as is plainly seen in Fig. 2. The rim 14 also tapers so that the extreme edge of the cover 12 as at 16 is of relatively thin section.

The rim 14 is provided with a continuous exterior rib 18 having a relatively sharp shoulder at 20 and a relatively rounded or beveled shoulder at 22, the latter being more closely adjacent the thin edge 16 of the rim. While this rib is preferably continuous, it need not be continuous, but may be interrupted, in which case the operation will be the same.

The container 10 is provided with a continuous interior groove indicated at 24. This groove is provided with a shoulder 26 which cooperates with shoulder 20 on rim 14 of the cover. These two shoulders will abut and prevent extraction of the rim 14 from the container 10. However, upon bringing the two members together so as to enter the rim into the container at the edge of the latter, the rounded shoulder 22 performs in the manner of a cam or wedge to allow the rim 14 to contract slightly so as to provide for the rib 18 to pass the rib 28 at the extreme edge of the container 10, the rib 28 being provided by the presence of the groove 24. The rib 28 snaps into the groove.

Figure 2:
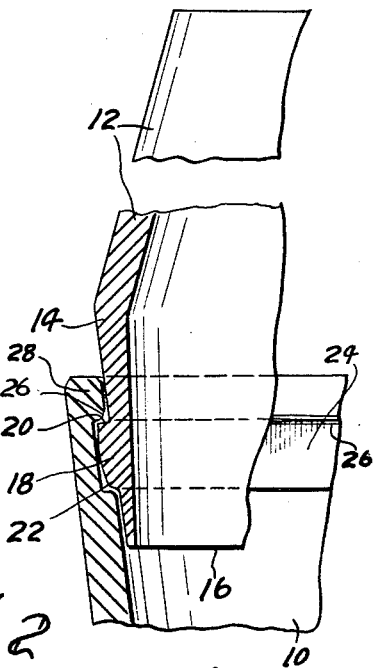
Fig. 2 is a section through the junction of the container and cover, on an enlarged scale.
Figure 3:
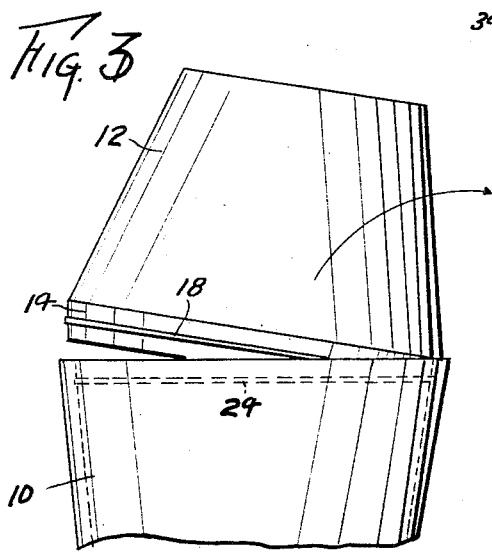
Fig. 3 illustrates a part of the detachable action.
Figure 4:
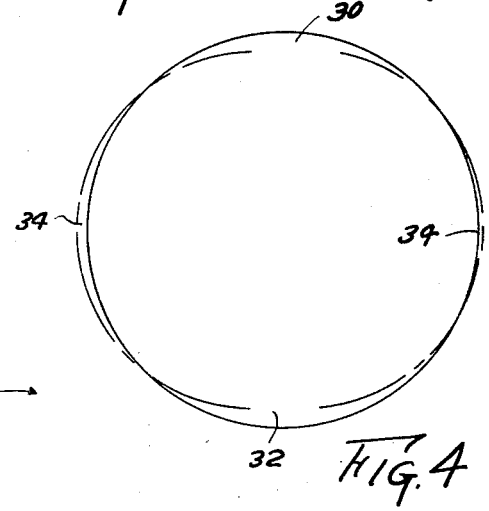
Fig. 4 illustrates the distortion of the container relative to the cover that allows for separation.

It will be seen that with the parts as shown in Fig. 2, mere pulling in opposite directions on the cover and container will fail to separate them. However, if the container is held in the hand and pressure is exerted by the thumb and forefinger at diametrically opposite positions on the container rim, as indicated at 30, 32 in Fig. 4, the container being of a resilient nature will become elongated in a direction at right angles to that of the application of the pressure. In this elliptical form, a gap will appear at the locations 34 between the rim portion and the edge at 28 of the container, whereupon a slight twist in the direction of the arrow in Fig. 3 will cause complete separation of the cover from the container.

When the container is pressed at positions 30, 32 as described, the cover at the rim portion 14 thereof does not become deformed to quite the extent that the container is deformed and therefore the gaps as described appear and the cover may be separated from the container by twisting the same in either direction substantially at right angles to the diameter of the container on a line drawn between the two positions of pressure 30 and 32.

As long as the container is conical with circular margins or rims, the pressure to be exerted at diametrically opposite points may be exerted at any positions about the periphery. Pressure could be exerted where the gaps appear in Fig. 4, in which case the gaps would then appear at the pressure points 30 and 32.

Of course, the important parts of the locking construction resides in the shoulders 20 and 26 and the entire groove 24 is not actually necessary inasmuch as the rib 28 may be as shown and described, but the wall of the container 10 may be thinner than shown, obviating the groove 24 but leaving the shoulder 26. It is the locking action between shoulders 20 and 26 that lays the basis of the present invention.

Having thus described my invention and the advantages thereof, I do not wish to be limited to the details herein disclosed, otherwise than as set forth in the claims, but what I claim is:

1. A closure connection for a container member having a cover member, said members both having smooth, uninterrupted exterior surfaces that are surfaces of revolution of a straight line, each member having a substantially circular rim, said connection comprising a circular continuous exterior rib on one member adjacent and parallel the rim thereof and an internal circular rib on the other member adjacent to and parallel the rim edge thereof, the rim of the said one member fitting into the rim of the said other member, said exterior rib being snapped past the internal rib, and the members being stiff, resilient, and slightly distortable upon manual pressure at diametrically opposite points at the rim portion of the said other member, so that the areas of the rim portions of the members may be made elliptic, the said other member being exterior to the said one member, being distortable to a greater degree than the said one member, whereby gaps appear between the rims at points at right angles to the pressure line.

2. The closure connection of claim 1 wherein both members are conical and the rims are at their widest portions, and the member having the exterior rib having a reversed conical portion at the rim, said exterior rib being located on the reversed conical portion.

References Cited in the file of this patent

UNITED STATES PATENTS

| 1,969,486 | Kurz | Aug. 7, 1934 |
| 2,614,727 | Robinson | Oct. 21, 1952 |

FOREIGN PATENTS

| 239,466 | Switzerland | Jan. 16, 1946 |
| 561,242 | Germany | Oct. 12, 1932 |